(12) United States Patent
Larson et al.

(10) Patent No.: US 12,528,411 B2
(45) Date of Patent: *Jan. 20, 2026

(54) INTERIOR REARVIEW MIRROR ASSEMBLY WITH FULL MIRROR VIDEO DISPLAY

(71) Applicant: MAGNA MIRRORS OF AMERICA, INC., Holland, MI (US)

(72) Inventors: Mark L. Larson, Grand Haven, MI (US); Christopher R. Koetje, Zeeland, MI (US); Anthony J. LaCross, Hastings, MI (US); Eric Peterson, West Olive, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 55 days.

This patent is subject to a terminal disclaimer.

(21) Appl. No.: 18/527,473

(22) Filed: Dec. 4, 2023

(65) Prior Publication Data
US 2024/0092267 A1    Mar. 21, 2024

Related U.S. Application Data

(60) Division of application No. 17/655,382, filed on Mar. 18, 2022, now Pat. No. 11,833,971, which is a
(Continued)

(51) Int. Cl.
*B60R 1/12* (2006.01)
*B60R 1/04* (2006.01)
(Continued)

(52) U.S. Cl.
CPC .................. *B60R 1/12* (2013.01); *B60R 1/04* (2013.01); *B60R 1/088* (2013.01); *B60R 1/26* (2022.01);
(Continued)

(58) Field of Classification Search
CPC .. B60R 1/12; B60R 1/04; B60R 1/088; B60R 1/26; B60R 2001/1223; B60R 2001/1253;
(Continued)

(56) References Cited

U.S. PATENT DOCUMENTS

| 1,949,138 A | 2/1934 | Bell |
| 5,668,663 A | 9/1997 | Varaprasad et al. |

(Continued)

FOREIGN PATENT DOCUMENTS

WO    2017191558 A1    11/2017

*Primary Examiner* — Michael Lee
(74) *Attorney, Agent, or Firm* — HONIGMAN LLP

(57) ABSTRACT

A vehicular interior rearview mirror assembly includes a mirror head pivotally adjustable about a mirror support. The mirror head includes a video display device disposed rearward of a prismatic mirror reflective element having a transflective mirror reflector. A touch sensor is disposed at the prismatic mirror reflective element and is associated with circuitry at a flexible printed circuit of the video display device. The video display device is operable to display video images captured by a rearward viewing camera of the vehicle. Light emitted by the video display device passes through the transflective mirror reflector for viewing of displayed video images by the driver of the vehicle viewing the prismatic mirror reflective element. The reflective region of the transflective mirror reflector of the prismatic mirror reflective element reflects at least 40 percent of visible light incident at the front side of the prismatic mirror reflective element.

23 Claims, 12 Drawing Sheets

Related U.S. Application Data continuation of application No. 16/949,177, filed on Oct. 19, 2020, now Pat. No. 11,279,288, which is a continuation of application No. 16/578,685, filed on Sep. 23, 2019, now Pat. No. 10,807,536, which is a continuation of application No. 15/635,627, filed on Jun. 28, 2017, now Pat. No. 10,421,404, which is a continuation-in-part of application No. 15/192,302, filed on Jun. 24, 2016, now Pat. No. 10,046,706.

(60) Provisional application No. 62/355,460, filed on Jun. 28, 2016, provisional application No. 62/237,716, filed on Oct. 6, 2015, provisional application No. 62/185,206, filed on Jun. 26, 2015.

(51) Int. Cl.
*B60R 1/08* (2006.01)
*B60R 1/26* (2022.01)
*H04N 7/18* (2006.01)

(52) U.S. Cl.
CPC .......... *B60R 2001/1223* (2013.01); *B60R 2001/1253* (2013.01); *B60R 2300/806* (2013.01); *B60R 2300/8066* (2013.01); *H04N 7/18* (2013.01)

(58) Field of Classification Search
CPC ...... B60R 2300/806; B60R 2300/8066; H04N 7/18

See application file for complete search history.

(56) References Cited

U.S. PATENT DOCUMENTS

| | | |
|---|---|---|
| 7,855,755 B2 | 12/2010 | Weller et al. |
| 8,508,831 B2 | 8/2013 | De Wind et al. |
| 8,730,553 B2 | 5/2014 | De Wind et al. |
| 9,057,875 B2 | 6/2015 | Fish, Jr. et al. |
| 9,205,780 B2 | 12/2015 | Habibi et al. |
| 9,346,403 B2 | 5/2016 | Uken et al. |
| 10,046,706 B2 | 8/2018 | Larson et al. |
| 10,421,404 B2 * | 9/2019 | Larson ................ B60R 1/04 |
| 10,807,536 B2 * | 10/2020 | Larson ................ B60R 1/04 |
| 11,279,288 B2 * | 3/2022 | Larson ................ B60R 1/12 |
| 11,833,971 B2 * | 12/2023 | Larson ................ B60R 1/04 |
| 2005/0195488 A1 | 9/2005 | McCabe et al. |
| 2008/0211735 A1 | 9/2008 | Balcerzak et al. |
| 2008/0212189 A1 * | 9/2008 | Baur ................ B60R 1/1207 |
| | | 359/872 |
| 2009/0015736 A1 | 1/2009 | Weller et al. |
| 2009/0296190 A1 | 12/2009 | Anderson et al. |
| 2010/0201816 A1 | 8/2010 | Lee et al. |
| 2011/0141381 A1 * | 6/2011 | Minikey, Jr. ............ B60R 1/12 |
| | | 349/11 |
| 2012/0182141 A1 | 7/2012 | Peterson et al. |
| 2012/0182242 A1 | 7/2012 | Lindahl et al. |
| 2013/0048835 A1 | 2/2013 | Drummond et al. |
| 2013/0112679 A1 | 5/2013 | Van Wyhe et al. |
| 2013/0170013 A1 | 7/2013 | Tonar |
| 2014/0036338 A1 | 2/2014 | Bareman et al. |
| 2014/0139902 A1 | 5/2014 | Baumann et al. |
| 2014/0347488 A1 | 11/2014 | Tazaki et al. |
| 2016/0375833 A1 | 12/2016 | Larson et al. |
| 2017/0255300 A1 | 9/2017 | Lindahl et al. |
| 2017/0327044 A1 | 11/2017 | Baur |
| 2017/0355312 A1 | 12/2017 | Habibi et al. |
| 2018/0251069 A1 | 9/2018 | LaCross et al. |

* cited by examiner

INTERIOR REARVIEW MIRROR ASSEMBLY WITH FULL MIRROR VIDEO DISPLAY

CROSS REFERENCE TO RELATED APPLICATIONS

The present application is a continuation of U.S. patent application Ser. No. 17/655,382, filed Mar. 18, 2022, now U.S. Pat. No. 11,833,971, which is a continuation of U.S. patent application Ser. No. 16/949,177, filed Oct. 19, 2020, now U.S. Pat. No. 11,279,288, which is a continuation of U.S. patent application Ser. No. 16/578,685, filed Sep. 23, 2019, now U.S. Pat. No. 10,807,536, which is a continuation of U.S. patent application Ser. No. 15/635,627, filed Jun. 28, 2017, now U.S. Pat. No. 10,421,404, which claims the filing benefits of U.S. provisional application Ser. No. 62/355,460, filed Jun. 28, 2016, which is hereby incorporated herein by reference in its entirety. U.S. patent application Ser. No. 15/635,627 also is a continuation-in-part of U.S. patent application Ser. No. 15/192,302, filed Jun. 24, 2016, now U.S. Pat. No. 10,046,706, which claims the filing benefits of U.S. provisional applications, Ser. No. 62/237,716, filed Oct. 6, 2015, and Ser. No. 62/185,206, filed Jun. 26, 2015, which are hereby incorporated herein by reference in their entireties.

FIELD OF THE INVENTION

The present invention relates generally to the field of interior rearview mirror assemblies for vehicles and, more particularly, to interior rearview mirror assemblies with a display.

BACKGROUND OF THE INVENTION

It is known to provide a mirror assembly that is adjustably mounted to an interior portion of a vehicle, such as via a double ball pivot or joint mounting configuration where the mirror casing and reflective element are adjusted relative to the interior portion of a vehicle by pivotal movement about the double ball pivot configuration. The mirror casing and reflective element are pivotable about either or both of the ball pivot joints by a user that is adjusting a rearward field of view of the reflective element. It is also generally known to provide a display screen at the mirror assembly.

SUMMARY OF THE INVENTION

The present invention provides an interior rearview mirror assembly that includes a mirror casing, a mirror reflective element and a display device disposed behind the mirror reflective element and operable to display information for viewing by the driver of the vehicle through the mirror reflective element. The mirror reflective element comprises a transflective mirror reflector whereby the mirror reflector reflects light that is incident on the reflective element and partially transmits illumination emitted from the display device through the mirror reflective element. The mirror assembly includes a polymer reflector or film disposed between the mirror reflective element and the display screen. The polymer reflector or film converts linearly polarized light (that is emitted by the display screen) to circularly polarized light (that passes through the reflective element). The display screen or display area of the display device generally encompasses or spans the height and width of the mirror reflective element and may occupy at least 75 percent of the electro-optically active reflective area of the mirror reflective element.

These and other objects, advantages, purposes and features of the present invention will become apparent upon review of the following specification in conjunction with the drawings.

BRIEF DESCRIPTION OF THE DRAWINGS

FIG. 2A is a sectional view of the video display device of FIG. 2;

DESCRIPTION OF THE PREFERRED EMBODIMENTS

Figure 1:
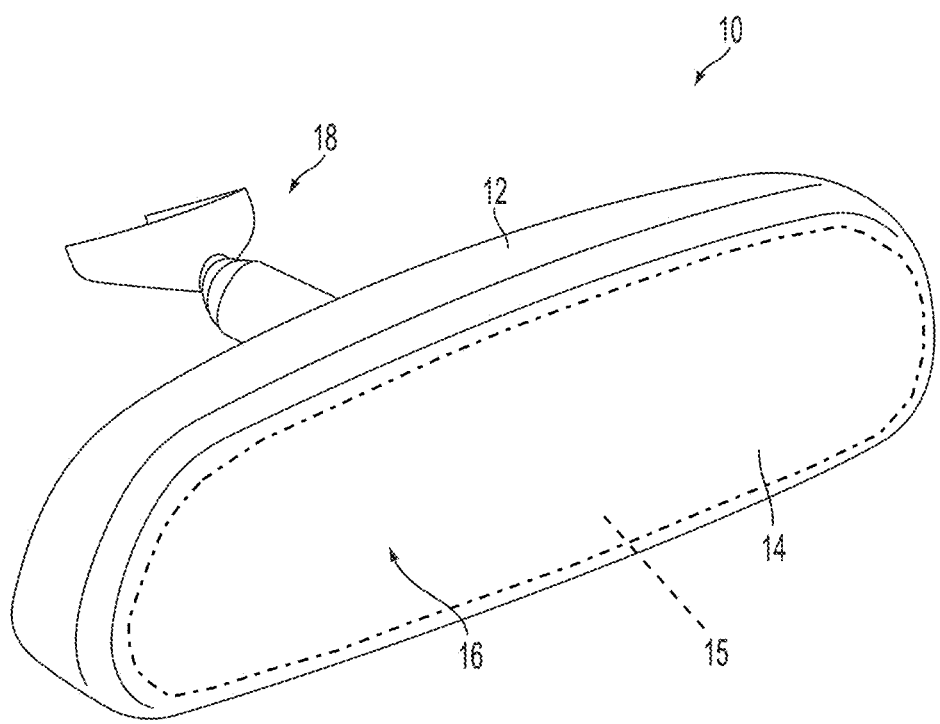
FIG. 1 is a perspective view of an interior rearview mirror assembly in accordance with the present invention.
Figure 2:
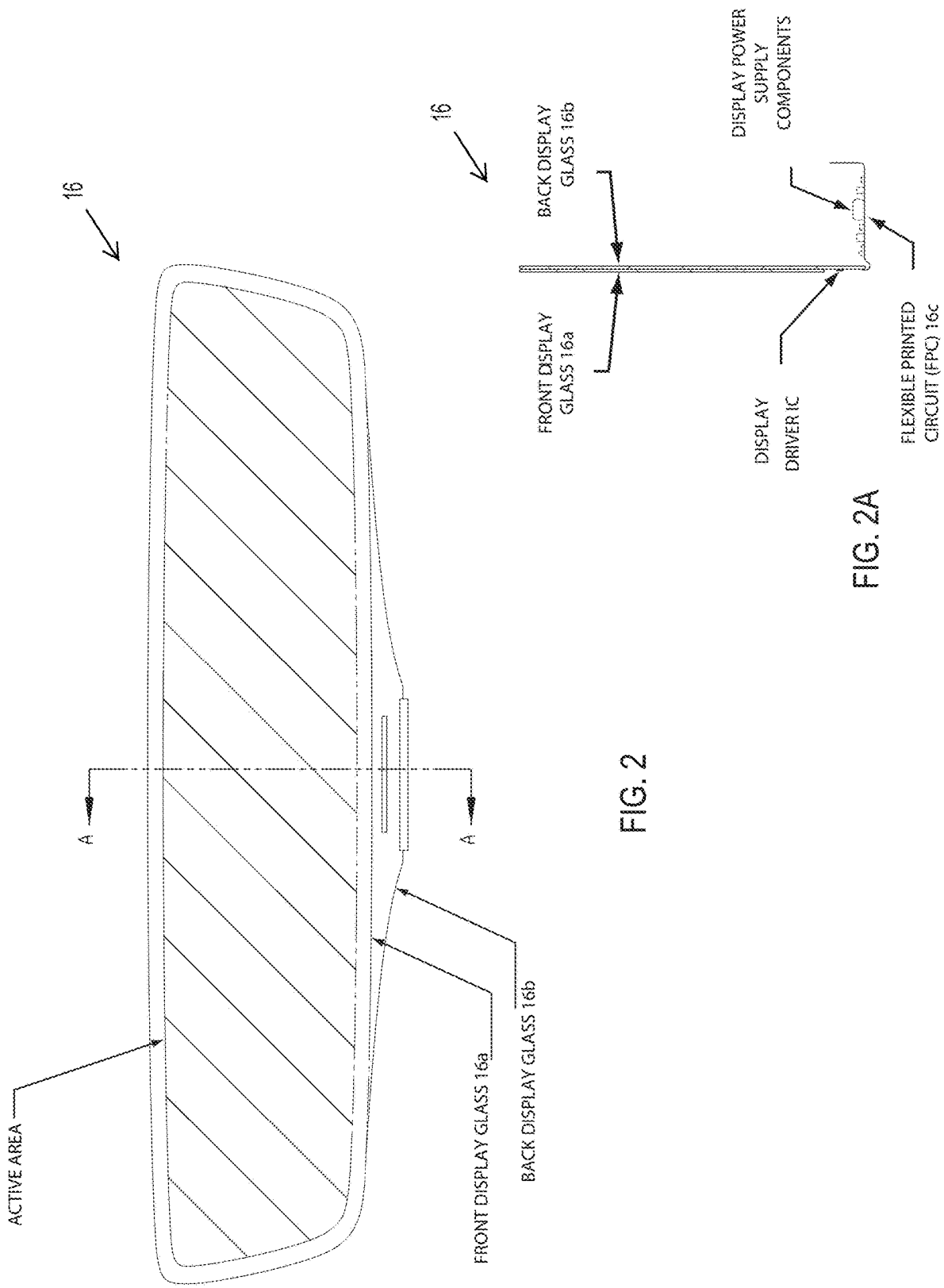
FIG. 2 is a front elevation view of a video display device for an interior rearview mirror assembly in accordance with the present invention.

Referring now to the drawings and the illustrative embodiments depicted therein, an interior rearview mirror assembly 10 for a vehicle includes a casing 12 that houses a reflective element 14 and a display device 16, which provides a display area 15 visible to the driver of the vehicle through the reflective element 14 (FIGS. 1 and 2). In the illustrated embodiment, the mirror assembly 10 is configured to be adjustably mounted to an interior portion of a vehicle (such as to an interior or in-cabin surface of a vehicle windshield or a headliner of a vehicle or the like) via a mounting structure or mounting configuration or assembly 18. The casing 12 of the interior rearview mirror assembly 10 may house all or a portion of the components of the interior rearview mirror assembly 10 and may be integrally formed with portions thereof.

The principal or main viewing area of the full display video mirror has the same or slightly better field of view of a typical rearview mirror (minimum of about 20 degrees). This image could be 1:1 scale of what a reflected image would be. The left and right end zones may be delineated by a divider overlay image. Those end zones would display a distorted image so that a greater horizontal and/or vertical field of view can be seen. This would be similar to a convex or aspheric or "flat to bent" reflector. This could be tuned to reduce/eliminate blind zones between the exterior rearview mirror view and the interior rearview mirror view. Also, those end zones could have different display modes, such as, for example, a "trailering mode" or the like, where the zones could potentially show the edges of the road (with overlay of car edges or actual edges) so at a glance the driver can see how the equipped vehicle is centered in the lane. The display may include a "1:1 mode" that would turn off the dividers if that is annoying to some drivers. The mirror assembly and video display device may utilize aspects of the assemblies and devices described in U.S. Pat. No. 7,855,755 and/or U.S. Publication No. US-2016-0375833 and/or U.S. patent application Ser. No. 15/613,357, filed Jun. 5, 2017, and published Dec. 14, 2017 as U.S. Patent Publication No. US-2017-0355312, and/or U.S. provisional application Ser. No. 62/501,263, filed May 4, 2017, and/or PCT Application No. PCT/1617/52542, filed May 2, 2017 and published Nov. 9, 2017 as International Publication No. WO 2017/191558, which are hereby incorporated herein by reference in their entireties.

The mirror reflective element 14 of the interior rearview mirror assembly 10 may comprise an electro-optic mirror reflective and the display device 16 is disposed at a rear surface of the electro-optic mirror reflective element for emitting illumination and displaying images and/or other information at the display area 15. In the illustrated embodiment, the display area 15 encompasses substantially all of the reflective element 14, such that the display area 15 is substantially the same size as the visible reflective surface. For example, the display area 15 may occupy at least 75 percent of the area of the visible reflective surface of the reflective element (or the electro-optically active region of the reflective element), preferably at least 85 percent of the area of the visible reflective surface of the reflective element, and more preferably at least 95 percent of the area of the visible reflective surface of the reflective element. The display device 16 is disposed at the rear surface of the electro-optic mirror reflective element 14, with a mirror reflector film or layer disposed at the front surface of the rear substrate (commonly referred to as the third surface of the reflective element) and opposing an electro-optic medium, such as an electrochromic medium disposed between the front and rear substrates and bounded by a perimeter seal. Optionally, the mirror reflector could be disposed at the rear surface of the rear substrate (commonly referred to as the fourth surface of the reflective element), while remaining within the spirit and scope of the present invention.

The mirror reflector comprises a transflective mirror reflector and provides a substantially reflective layer at the display area 15, while being at least partially transmissive of light or illumination emitted by display device 16, as discussed below. The transflective mirror reflector is partially transmissive of visible light therethrough and partially reflective of visible light incident thereon and, thus, the presence of the video display device behind the reflective element is rendered covert by the transflective mirror reflector and information displayed by the video display device is only viewable through the mirror reflector and reflective element when the video display device is activated or backlit to display such images and/or information for viewing by the driver of the vehicle when the driver is normally operating the vehicle.

In the illustrated embodiment, the electro-optic mirror reflective element 14 of the interior rearview mirror assembly 10 includes a front substrate and a rear substrate spaced from front substrate with the electro-optic medium (such as an electrochromic medium) and transparent conductive or semi-conductive layers (such as described below) sandwiched between the substrates (with the transparent conductive layer disposed at a rear surface of front substrate [the second surface of the laminate electro-optical element] and the transparent conductive layer disposed at the front surface of rear substrate [the third surface of the laminate electro-optical element]). For example, the conductive layers may comprise an indium tin oxide (ITO) material or a thin metallic layer sandwiched between two transparent conductive layers (a TC/M/TC stack of layers) such as ITO/Metal/ITO (for example, ITO/Ag/ITO) or a doped tin oxide or a doped zinc oxide or the like, so as to provide the desired conductivity and transparency at the second and third surfaces of the fourth surface reflector reflective element or cell. An electrical sheet resistance of less than about 20 ohms/square is preferred for such transparent conductor layers; more preferably less than about 15 ohms/square and most preferably less than about 10 ohms/square, while visible light transmission through such transparent conductive coated substrates is preferably at least about 70% T, more preferably at least about 75% T and most preferably is at least about 80% T. An epoxy seal material or the like is applied between the substrates to define the cavity for the electrochromic medium and to adhere the substrates together.

The display device is operable to display video images captured by a rearward viewing camera, such as a camera mounted at a rear portion of the vehicle or that views through a rear window of the vehicle so as to have a rearward field of view rearward and at least partially sideward of the vehicle. The camera may capture images during normal operation of the vehicle, such as when the driver of the vehicle drives the vehicle forwardly along a road. Video images are displayed by the display device during such normal operation, such as to provide enhanced rearward viewing that encompasses regions not viewable to a driver of a vehicle viewing a conventional interior rearview mirror assembly. The display device may also display other information to the driver, such as advanced driver assistance system (ADAS) information or the like, such as via text or images or icons or indicia displayed at or over or instead of the video images, depending on the particular situation and desired display appearance. Optionally, the system may determine that the mirror head is not adjusted for proper rearward viewing or for viewing of displayed images, and the display device may display a message (such as text or indicia or the like) to alert the driver to adjust the angle of the mirror head for optimum or enhanced viewing by the driver.

Optionally, the display system of the present invention may operate to adjust the field of view of the rearward viewing camera so that the desired or appropriate view is displayed at the video display device. For example, the field of view may be angled or aimed upward or generally horizontal for highway or "normal" driving, and may be angled or aimed downward for parking driving situations. The field of view may be adjusted by mechanically adjusting the camera or by displaying different portions of a wide angle field of view of the camera (such as by displaying only a lower region of the captured image data for parking maneuvers).

In the illustrated embodiment, the display device 16 comprises a display module having a display screen (such as a multi-pixel LCD panel/screen backlit by a plurality of LEDs) and a circuit element (such as a printed circuit board or the like, such as a silicon substrate having circuitry established thereon) disposed at the rear of the display screen. Circuit board has circuitry established thereat (such as by establishing the circuitry at or on a silicon substrate using CMOS technology or the like), and such circuitry may be configured for controlling the display functions and for controlling the dimming or variable reflectance of the reflective element.

As shown in FIGS. 2 and 2A, the display device 16 includes a front glass substrate 16a and a rear glass substrate 16b, with the circuitry associated with the display being disposed at a flexible printed circuit (FPC) 16c. The circuitry includes display power supply components and display driver IC and other circuitry associated with powering and controlling or reconfiguring the display device. In the illustrated embodiment, the back display glass extends below the front glass at a central region, so that the connector and circuitry is disposed at a central region below the active display area. When disposed behind a mirror reflective element, the reflective element may have a central chin portion that extends down to generally encompass the lower region of the back display glass and the FPC.

Figure 3:
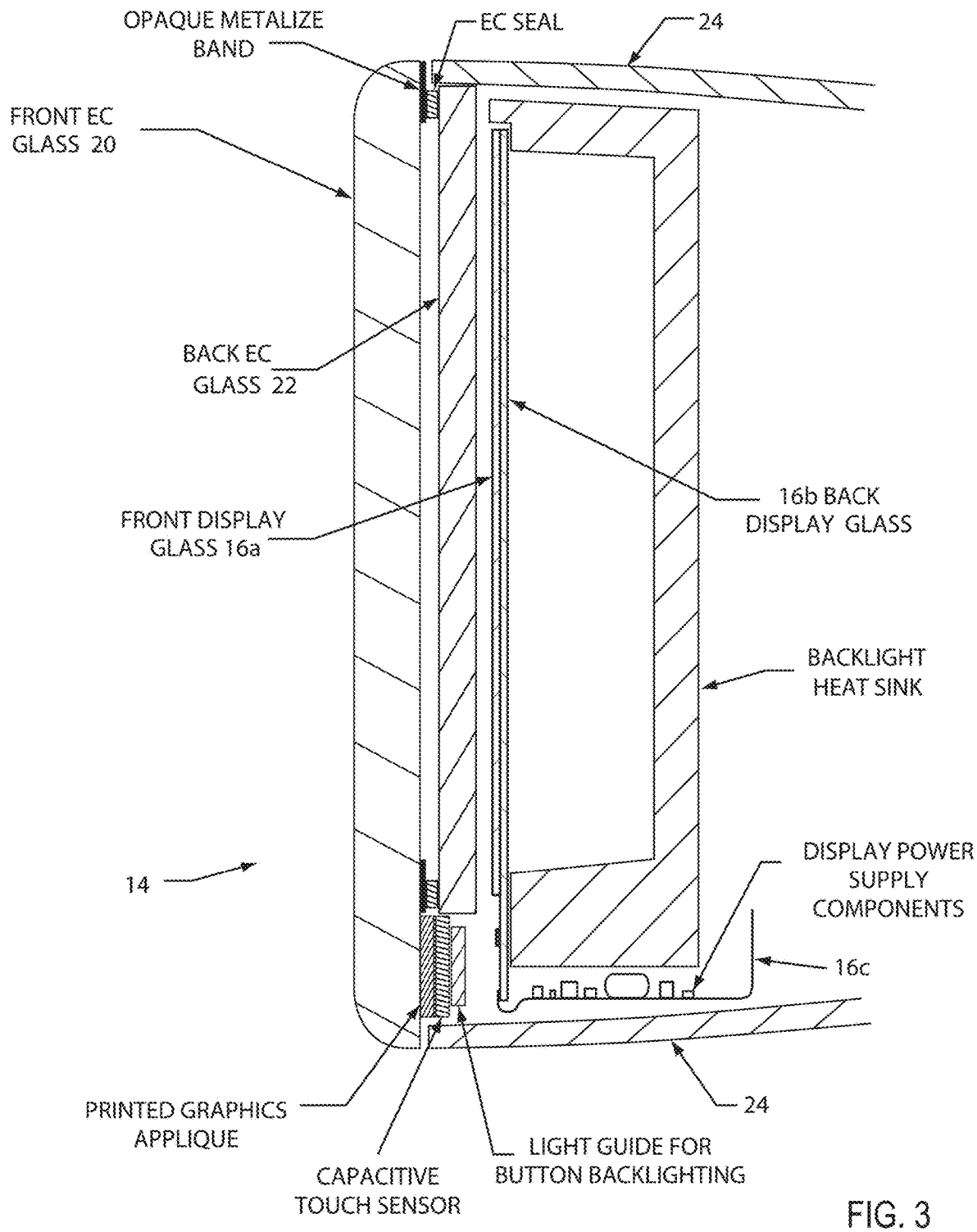
FIG. 3 is a sectional of an interior rearview mirror assembly in accordance the present invention.

For example, and such as shown in FIG. 3, the reflective element 14 may have a front glass substrate 20 and a rear glass substrate 22, with the front glass substrate extending downward (beyond a lower perimeter region of the rear glass substrate) so as to provide an overhang region at the lower portion of the reflective element at the central lower region of the back display glass 16b. The reflective element is nested in the mirror housing or casing 24 with the display device disposed behind the reflective element and in the mirror casing. The FPC 16c is routed below the backlight and its heat sink and within the mirror casing, where it can be electrically connected to circuitry of the mirror assembly or to a wire harness or the like for electrically powering the video display device.

In the illustrated embodiment, the lower region of the front substrate 20 of the reflective element has a printed graphics applique and capacitive touch sensor (and optionally a light guide for backlighting the applique and sensor), such as for a user input to allow the driver of the vehicle to turn on and off the display device and/or turn on and off the dimming mirror and/or the like. In an EC mirror construction, the overhang region below the rear substrate and perimeter EC seal provides space for such a sensor or sensors and the like in front of the lower region of the rear display glass and connection with the FPC.

Figure 3A:
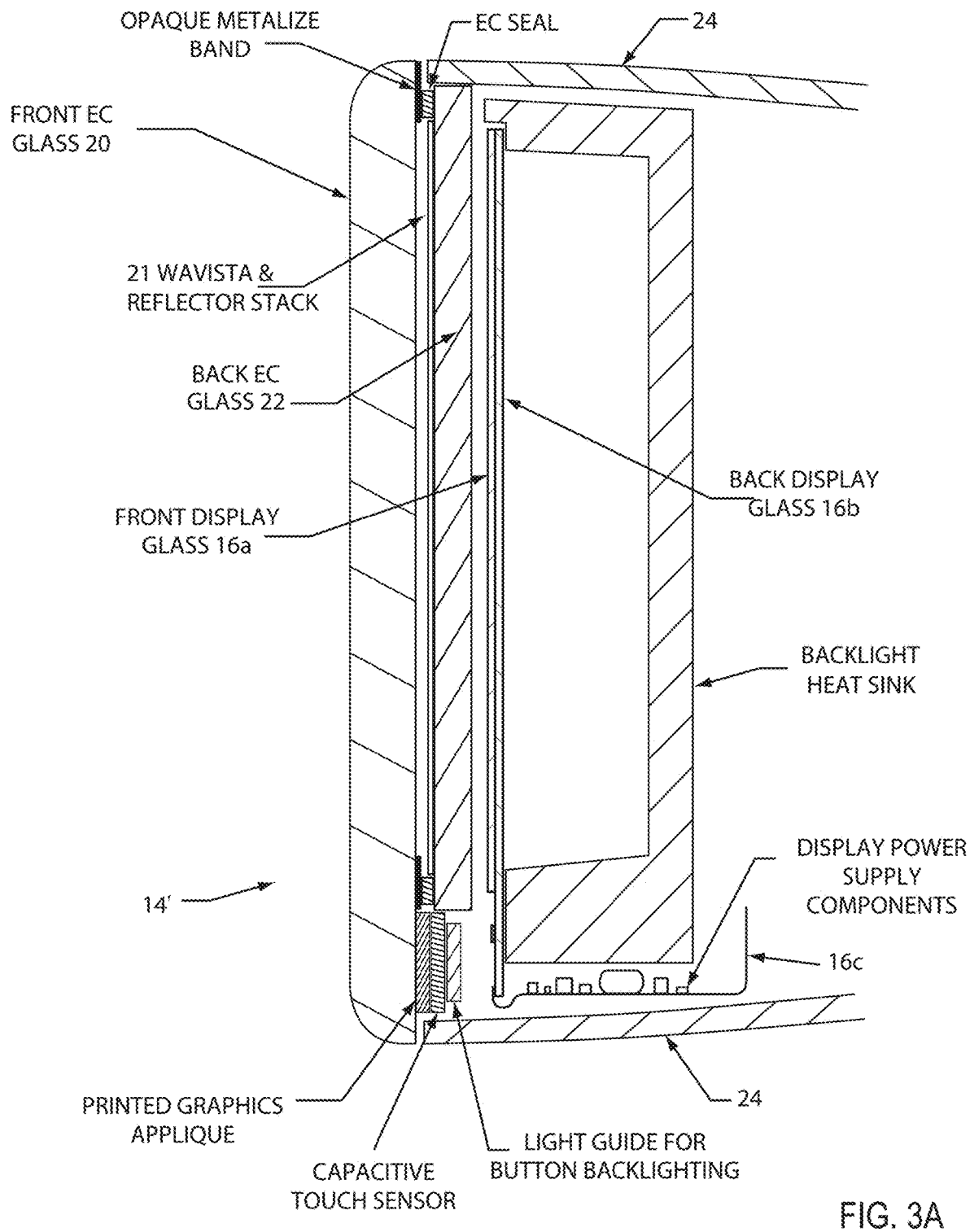
FIG. 3A is a sectional of another interior rearview mirror assembly in accordance the present invention.

As shown in FIG. 3A, the reflective element 14' comprises a third surface reflector mirror with a metallic partially reflective and partially light transmissive reflector disposed at the front surface of the rear substrate (the "third surface" that opposes the EC medium or SPM layer). The reflective element 14' also includes a thin polymer reflector (such as a Wavista film commercially available from Fujifilm) disposed at the mirror reflector (such as an EC mirror reflector stack comprising multiple layers or coatings to provide the desired degrees of light transmission and reflection of light incident thereon). For example, the Wavista and reflector stack 21 (which may comprise multiple thin layers of partially transmissive and/or partially reflective layers) may have the Wavista film adhered at the front surface of the rear glass substrate with the reflector coatings or stack disposed over the Wavista film, or the reflector coatings or stack may be disposed at the front surface of the rear glass substrate, with the Wavista film established over the reflector coatings/stack.

The rear glass substrate may comprise any suitable glass substrate, such as a substrate having a thickness of around 2 mm or thereabouts. Optionally, the rear substrate may comprise Gorilla glass, which may have a thickness of between about 0.4 mm and 1.1 mm. Such an application of Gorilla glass provides a weight reduction to the mirror and may provide an increase in strength of the mirror reflective element that may provide enhanced head impact protection. The Wavista and reflector stack may be disposed at the front surface of the Gorilla Glass substrate. The thin rear substrate allows for the reflector stack to be disposed at the front surface and the Wavista film to be disposed at the rear surface of the thin rear glass substrate.

Figure 4:
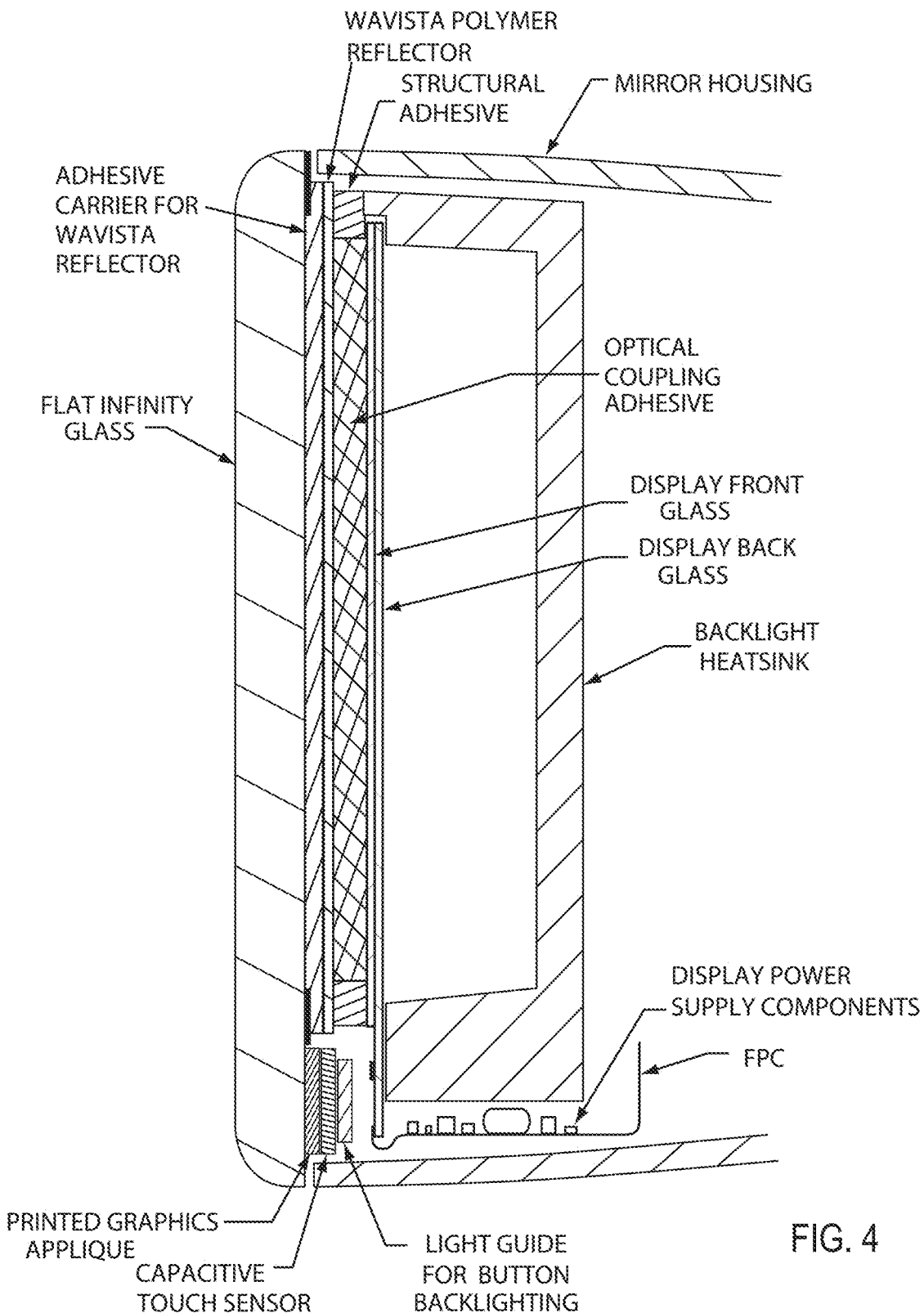
FIG. 4 is a sectional of another interior rearview mirror assembly in accordance the present invention.

As shown in FIG. 4, for a flat or planar single substrate reflective element, a thin film metal reflector coating stack is disposed at the rear surface of the mirror substrate, and a polymer reflector (such as a Wavista film commercially available from Fujifilm) is adhered at the metal reflector via a layer of adhesive (such as a very thin layer of about 15 microns or thereabouts) so as to optically couple the polymer reflector with the metal transflective reflector. The front glass of the video display device is optically coupled with the polymer reflector via an optical coupling adhesive (such as a thin layer of optical silicone or acrylic), which may be bounded by a structural seal or adhesive to contain the optical adhesive and to provide the desired or appropriate gap or spacing for the optical adhesive. Optionally, the display screen may be optically bonded to the mirror substrate with or without the polymer reflector disposed therebetween. Because the adhesive layers and reflector layers are quite thin, there is little space between the lower region of the mirror substrate and the lower region of the display back glass for the touch sensor and backlighting. Optionally, a spacer may be provided to space the video display device rearward of the polymer reflector a sufficient amount to allow for the touch sensor and backlighting. Optionally, the rear surface of the lower region of the mirror substrate may be ground to provide a recess or indentation to provide additional spacing for the touch sensor and backlighting.

Figure 5:
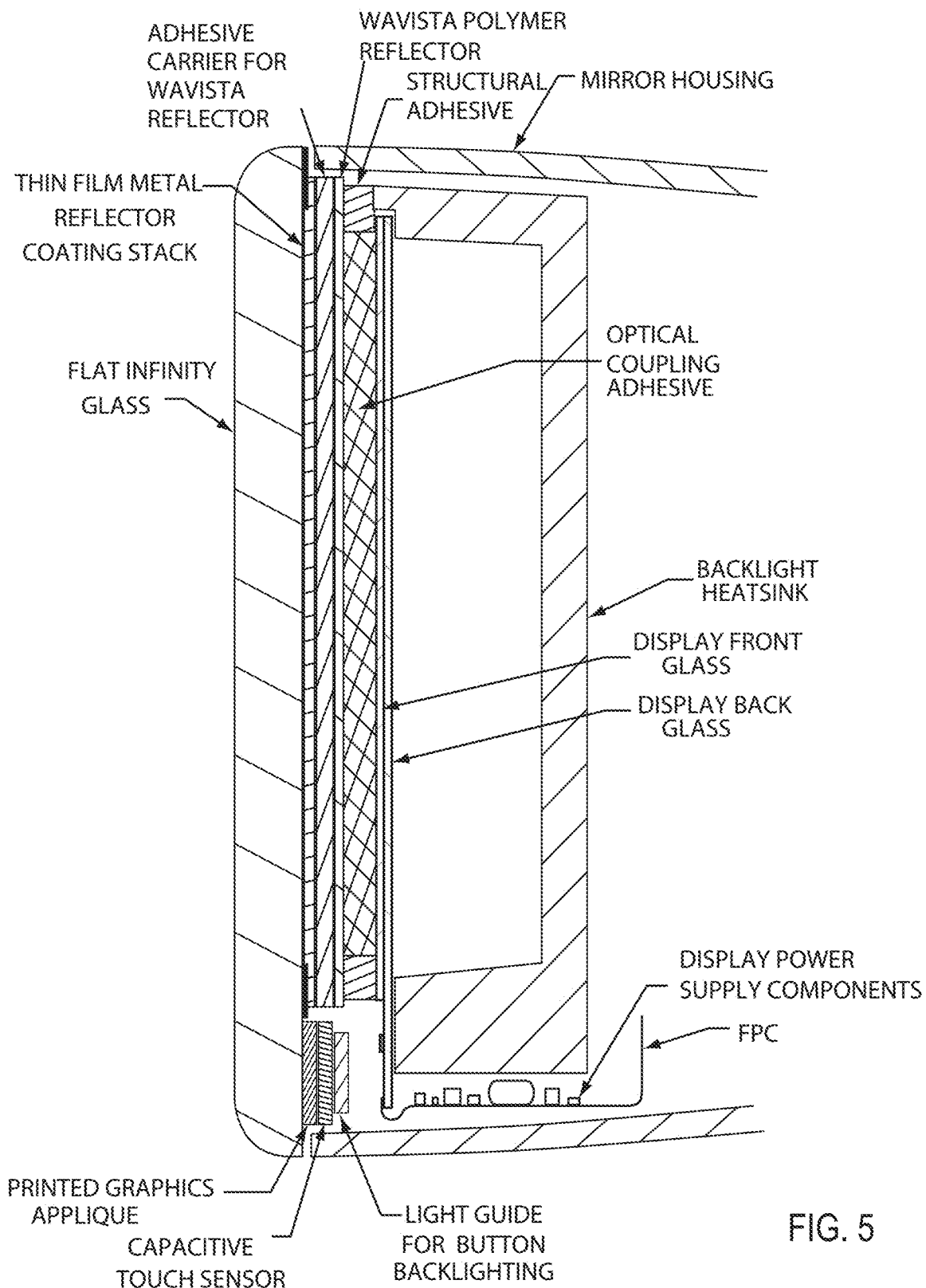
FIG. 5 is a sectional of another interior rearview mirror assembly in accordance the present invention.
Figure 8:
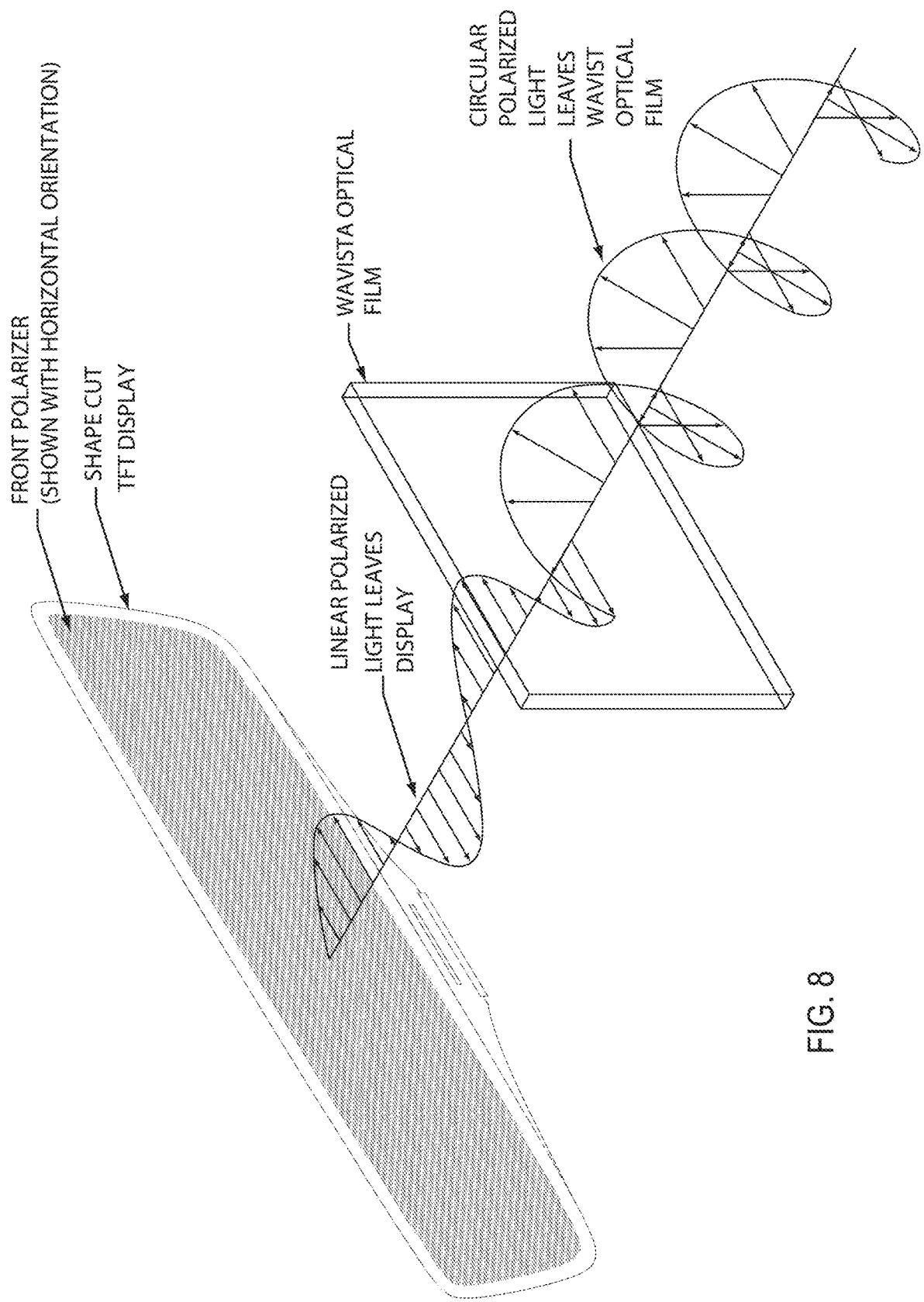
FIG. 8 is a schematic diagram showing a video display device of the present invention, showing use of an optical film that changes the linearly polarized light that is emitted by the display device to circular polarized light.
Figure 9:
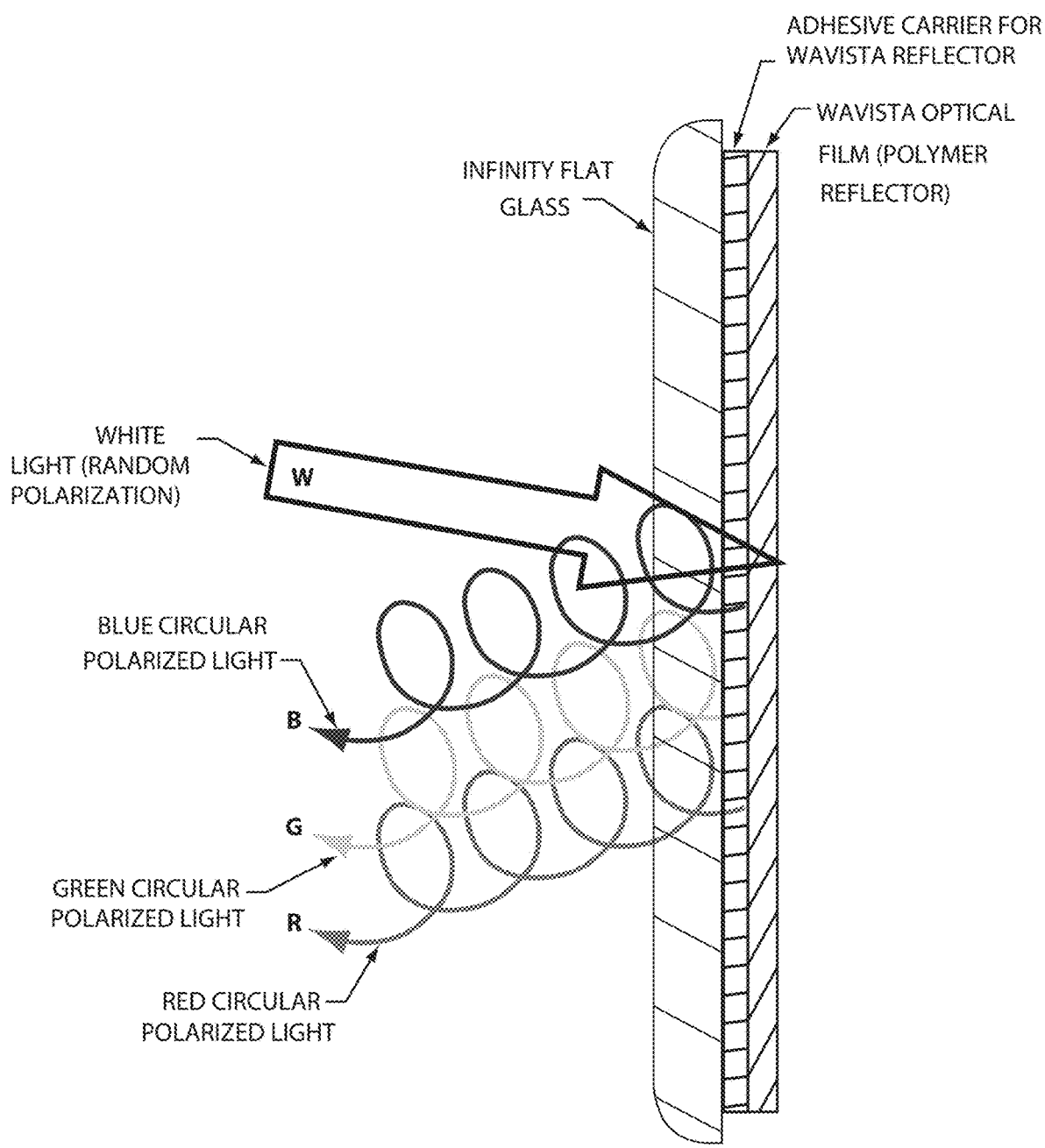
FIG. 9 is a schematic diagram of the video display device of the present invention, showing the reflected light as circularly polarized light.
Figure 10:
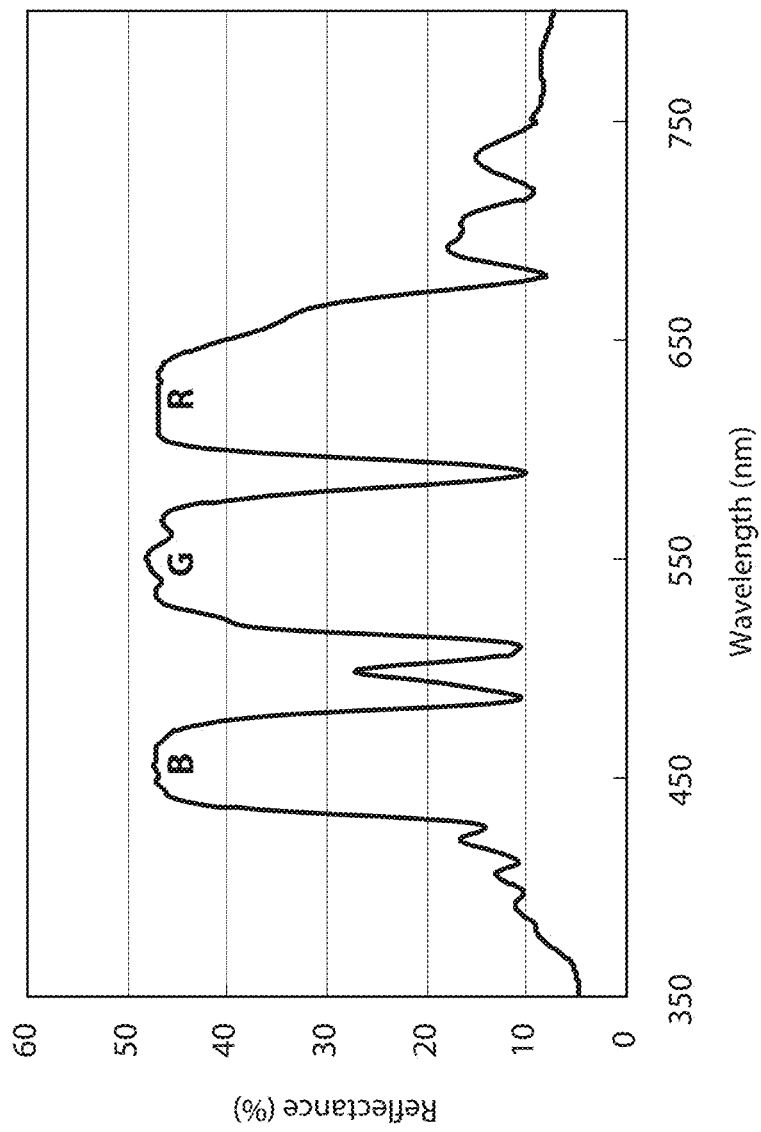
FIG. 10 is a graph of the spectral reflectance of light at the optical film of the video display device of the present invention.
Figure 11:
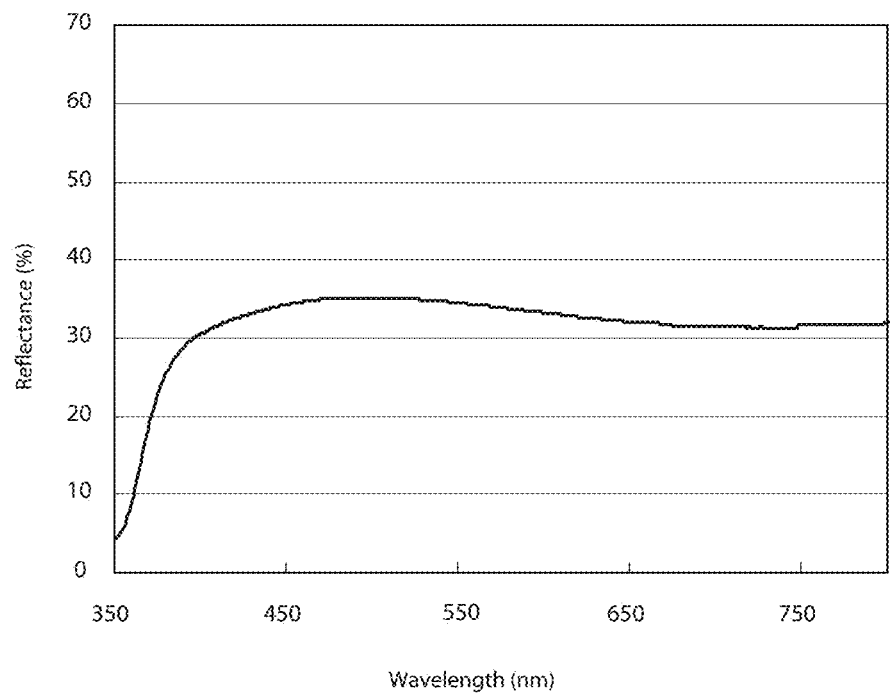
FIG. 11 is a graph of the spectral reflectance of light at a metal thin film mirror reflector.
Figure 12:
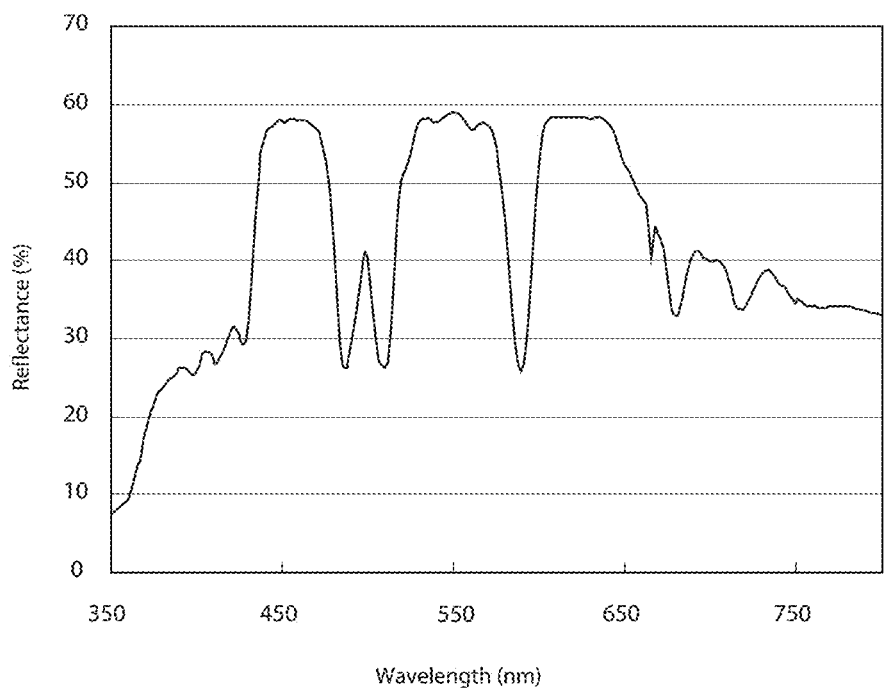
FIG. 12 is a graph of the spectral reflectance of light at an optical film bonded to a metal thin film mirror reflector.

The polymer reflector functions to convert linear polarized light (such as emitted by the video display device) to circularly polarized light (see FIGS. 8 and 9), and provides the reflective characteristics shown in FIG. 10, showing three discrete bands of light reflected by individual polymer layers within the Wavista optical film stack at 8 degrees. For example, and such as shown in FIG. 8, light emitted by the mirror-shape cut or formed TFT display screen may be horizontally polarized, and, as it passes through a Wavista optical film, the light is converted to circularly polarized light. Optionally, the polymer reflector and video display device may be implemented at the rear of a mirror glass substrate without a metal reflector at the rear surface of the mirror substrate (such as shown in FIG. 4). The addition of a metal reflector (FIG. 5) at the rear of the mirror substrate enhances the reflectivity and is still partially transmissive, and also partially neutralizes the color of the reflected image (that may otherwise be tinted due to the polymer reflector characteristics). A graphical representation of the reflective characteristics at 8 degrees of a thin film metal reflector is shown in FIG. 11 and of a hybrid polymer reflector optically coupled to the thin film metal reflector is shown in FIG. 12. When the polarization of the display output is aligned with the polarization of the film/reflector, the mirror reflective element and display construction can achieve up to about 90% T and up to about 40% R to 50% R.

Figure 6:
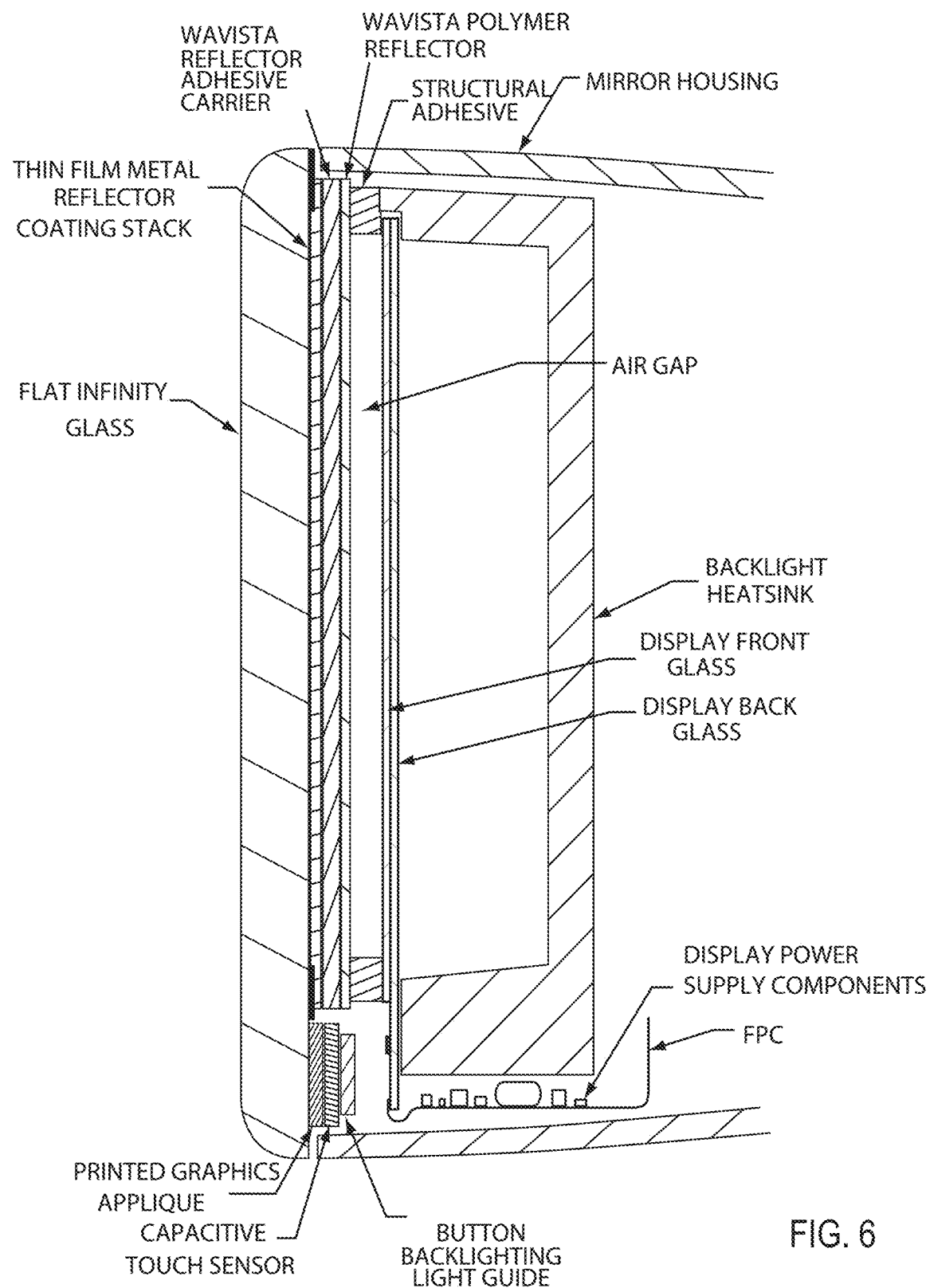
FIG. 6 is a sectional of another interior rearview mirror assembly in accordance the present invention.
Figure 7:
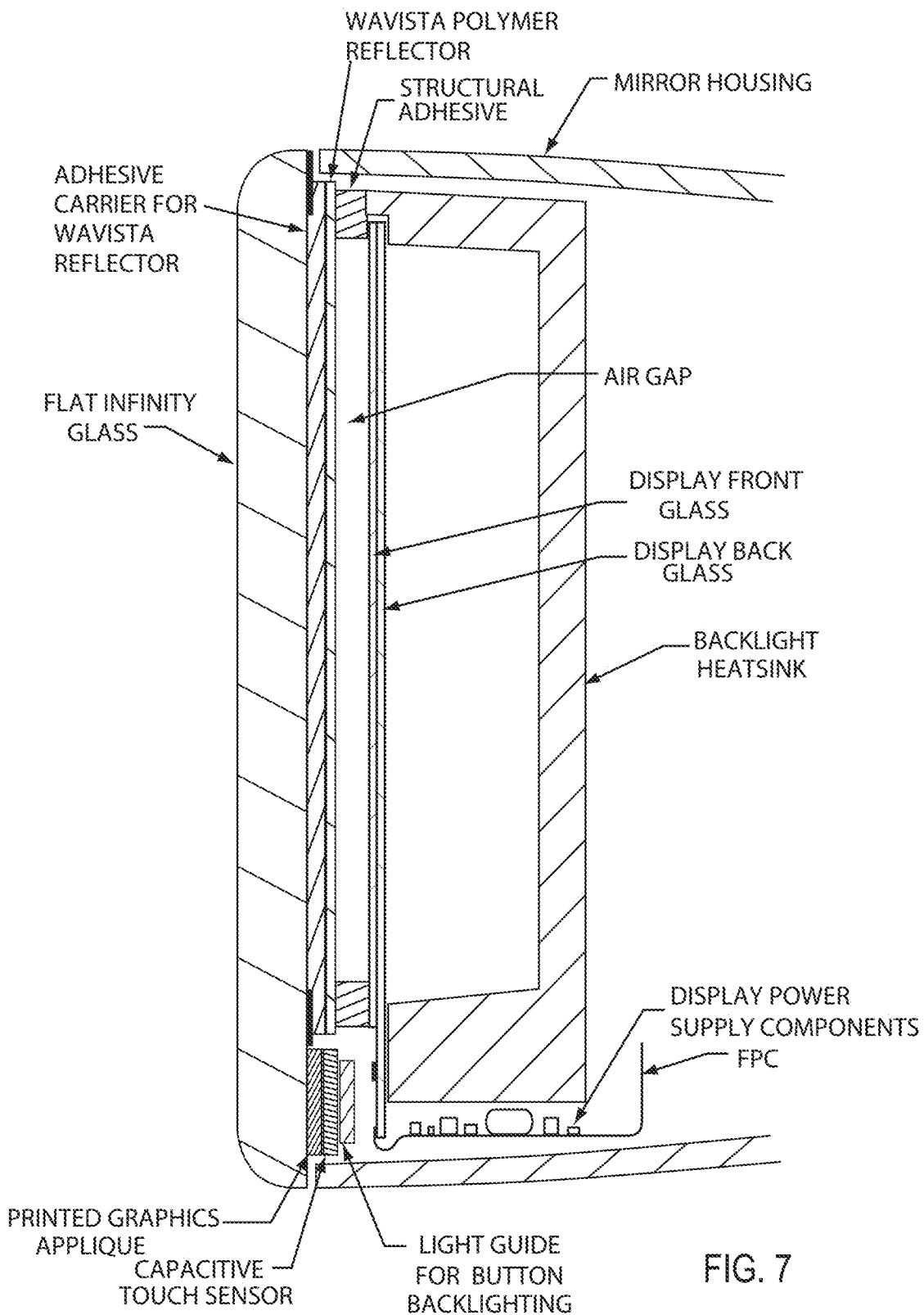
FIG. 7 is a sectional of another interior rearview mirror assembly in accordance the present invention.

Optionally, and such as shown in FIGS. 6 and 7, the video display device may be spaced from the polymer reflector via a perimeter structural adhesive that at least substantially circumscribes the display front glass of the display device, such that there is an air gap (no optical adhesive) between the display front glass and the polymer reflector at the active display region of the display device.

The mirror assembly of the present invention thus provides enhanced light transmission through the reflective element assembly, so that the display screen may be viewable with reduced backlighting power. Because the display screen has cross dimensions so as to substantially encompass the reflective area or active area of the reflective element, the display screen, when backlit by a plurality of powered light emitting diodes, may generate significant heat. Thus, an increase in light transmission provided by the Wavista polymer layer allows for reduced powering of the LEDs, which results in reduced heat generation by the display screen. For example, with a Wavista polymer layer and reflector stack at a single substrate reflective element assembly or an undimmed electro-optic reflective element assembly may allow for at least about 35 percent light transmission and at least about 40 percent reflectivity of light incident at the reflective element assembly. Preferably, the mirror reflective element assembly, with a Wavista polymer layer (disposed behind a single substrate of a fixed reflectance mirror reflective element assembly or disposed behind the electro-optic medium of a variable reflectance mirror reflective element assembly) as described herein, provides at least about 40 percent visible light transmission or at least about 50 percent visible light transmission and up to about 60 percent visible light transmission, while also providing at least about 60 percent visible light reflectance, or at least about 50 percent visible light reflectance or at least about 40 percent visible light reflectance. Such a mirror reflective element assembly thus is twice as transmissive to visible light as known transflective mirror reflective elements, which typically are up to around 25 percent light transmissive (or less).

The polymer layer provides enhanced visible light transmission and enhanced visible light reflectance, which allows the display screen to be operated at reduced power (and thus generating a reduced amount of heat). The addition of the Wavista polymer layer allows for use of a more transmissive transflective reflector or stack without such use resulting in the display screen being viewable through the reflective element by a driver of the vehicle viewing the mirror reflective element when the display screen is not activated.

Because the display screen may be active for prolonged periods of time, the mirror head and/or display screen or module preferably includes heat dissipating means, such as a heatsink or the like. Optionally, the housing may comprise a heat reducing or heat dissipating material, such as aluminum, plastic and/or magnesium or the like. In addition, the mounting bracket to the windscreen or windshield may be thermally connected, in order to increase the heat dissipation from the module.

As shown in FIG. 3, the reflective element may include an opaque hiding layer or perimeter metallized band at the periphery of the rear surface of the front substrate, in order to hide the perimeter seal from view (a similar perimeter band is shown in FIGS. 4-7, but at the rear of the single mirror substrate to hide the casing and other elements of the display device). Optionally, a perimeter hiding layer or band or mask may be disposed at the fourth surface (the rear surface of the rear substrate of an electro-optic reflective element) to hide elements of the display device.

Optionally, the circuit board may also be coupled with a photo/glare light sensor established rearward of the display device for providing a viewing angle capable to sensing glare on the display area, such as in a location rearward of the display screen and forward (as in forward with respect to the direction of the travel of the vehicle) of the front glass substrate for detecting or sensing the light (such as ambient light or glare light) at the mirror reflective element and the display device 16. The sensor may be disposed behind the front substrate (such as at an overhang region where the cross dimension of the front substrate is greater than the cross dimension of the rear substrate), so that the sensor is not behind the display screen or the electro-optic (such as electrochromic) medium.

The glare light sensor may be integrated with an ON/OFF user input or touch sensor behind the front glass substrate that is configured to actuate based on a touch event at an exterior surface of the electro-optic mirror reflective element. This integration reduces the overall dimensions of the mirror and optimizes light sensor position, namely, it places the light sensor closer to the first surface of front substrate of the reflective element, which allows for a wider viewing angle. Such a sensor may also be positioned at alternative locations and may also be used to sense night-time driving conditions of the vehicle, such as relative light conditions, headlights, and other conditions indicative of night-time driving. For instance, the glare light sensor may be integrated above the plane of the backlit thin film transistor (TFT)-LCD display screen or panel. With respect to the user input integrated with the sensor, the input or sensor may provide capacitive or optical detection of a finger, may include light management films to prevent backlight from affecting the sensor, and may include color applique, printed, or laser etched graphics. The user input or sensor and mirror assembly may utilize aspects of the sensors and mirror assemblies described in U.S. Pat. No. 8,154,418 and/or International Publication Nos. WO 2011/044312; WO 2012/051500 and/or WO 2013/071070, which are all hereby incorporated herein by reference in their entireties.

The display device, such as shown in FIG. 3, may be disposed behind an electro-optic reflective element and is operable to display images and information for viewing by the driver of the vehicle through the transflective mirror reflector coating. The display area of the display screen is sized to substantially encompass the electro-optically active region (the region bounded by the perimeter seal) of the mirror reflective element. The display device 16 may comprise any suitable display device, such as a video display device, and such as a multi-pixel display screen (such as a backlit dot matrix liquid crystal display or a thin film transistor or TFT display screen) that is backlit by a plurality of illumination sources, such as a two dimensional array of a plurality of white light-emitting light emitting diodes or the like. The display device may utilize aspects of the display-on-demand transflective type displays and/or video displays or display screens of the types disclosed in U.S. Pat. Nos. 8,890,955; 7,855,755; 7,338,177; 7,274,501; 7,255,451; 7,195,381; 7,184,190; 7,046,448; 5,668,663; 5,724,187; 5,530,240; 6,329,925; 6,690,268; 7,734,392; 7,370,983; 6,902,284; 6,428,172; 6,420,975; 5,416,313; 5,285,060; 5,193,029 and/or 4,793,690, and/or in U.S. Pat. Pub. Nos. US-2006-0050018; US-2009-0015736; US-2009-0015736 and/or US-2010-0097469, which are all hereby incorporated herein by reference in their entireties.

As discussed above, the mirror assembly may comprise an electro-optic or electrochromic mirror assembly that includes an electro-optic or electrochromic reflective element. The perimeter edges of the reflective element may be encased or encompassed by the perimeter element or portion of the bezel portion to conceal and contain and envelop the perimeter edges of the substrates and the perimeter seal disposed therebetween. The electrochromic mirror element of the electrochromic mirror assembly may utilize the principles disclosed in commonly assigned U.S. Pat. Nos. 7,274,501; 7,255,451; 7,195,381; 7,184,190; 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference in their entireties.

Although shown as an electrochromic mirror application, it is envisioned that the mirror assembly may comprise a prismatic or flat glass reflective element, while remaining within the spirit and scope of the present invention. For example, the full display mirror may comprise a fixed reflectance or non-electro-optic reflective element, such as a flat or planar glass reflective element or the like, with a transflective mirror reflector disposed at a rear surface of the reflective element. The reflective element may comprise a thin chrome layer and may comprise a dielectric mirror that is transparent and reflective, such as, for example, at least about 35 percent reflective (such as, for example, about 42 percent reflective or thereabouts). Optionally, the second surface of the LCD display screen may comprise a reflector to enhance reflectance of the mirror reflective element. Optionally, the front glass at the LCD display screen may comprise Gorilla glass or other suitably durable and thin and strong glass substrate.

Optionally, the reflective element may comprise a prismatic reflective element, and the prismatic mirror assembly may be mounted or attached at an interior portion of a vehicle (such as at an interior surface of a vehicle windshield) via any suitable mounting means, and the reflective element may be toggled or flipped or adjusted between its daytime reflectivity position and its nighttime reflectivity position via any suitable toggle means, such as by utilizing aspects of the mirror assemblies described in U.S. Pat. Nos. 6,318,870 and/or 7,249,860, and/or U.S. Publication No. US-2010-0085653, which are hereby incorporated herein by reference in their entireties. Optionally, for example, the interior rearview mirror assembly may comprise a prismatic mirror assembly, such as the types described in U.S. Pat. Nos. 7,420,756; 7,289,037; 7,274,501; 7,249,860; 7,338,177 7,255,451; 7,289,037; 7,249,860; 6,318,870; 6,598,980; 5,327,288; 4,948,242; 4,826,289; 4,436,371 and/or 4,435,042, which are hereby incorporated herein by reference in their entireties. A variety of mirror accessories and constructions are known in the art, such as those disclosed in U.S. Pat. Nos. 5,555,136; 5,582,383; 5,680,263; 5,984,482; 6,227,675; 6,229,319 and/or 6,315,421 (which are hereby incorporated herein by reference in their entireties), that can benefit from the present invention.

Optionally, the reflective element may include an opaque or substantially opaque or hiding perimeter layer or coating or band disposed around a perimeter edge region of the front substrate (such as at a perimeter region of the rear or second surface of the front substrate) to conceal or hide or the perimeter seal from viewing by the driver of the vehicle when the mirror assembly is normally mounted in the vehicle. Such a hiding layer or perimeter band may be reflective or not reflective and may utilize aspects of the perimeter bands and mirror assemblies described in U.S. Pat. Nos. 5,066,112; 7,626,749; 7,274,501; 7,184,190 and/or 7,255,451, and/or International Publication Nos. WO 2010/124064 and/or WO 2011/044312, which are all hereby incorporated herein by reference in their entireties.

Aspects of the display device and mirror reflective element construction of the present invention may also be used in video mirrors such as those described in U.S. Pat. No. 9,057,875 and/or U.S. Publication No. US-2014-0347488, which are hereby incorporated by reference herein in their entireties. In such video mirrors that utilize a full-screen or near full-screen video display, an actuator device may be adjustable to tilt a mirrored glass element in one direction, thereby moving the mirrored glass element to an off-axis position which approximately simultaneously changes the on/off state of a video display module. The actuator device is also adjustable to tilt the glass element in another direction, thereby moving the glass element to an on-axis position which approximately simultaneously changes the on/off state of the display module. The mirror assembly and display and adjustment may utilize aspects of the mirror assemblies described in U.S. Pat. No. 9,205,780, which is hereby incorporated herein by reference in its entirety.

The display device may also be controlled or operable in response to an input or signal, such as a signal received from one or more cameras or image sensors of the vehicle, such as a video camera or sensor, such as a CMOS imaging array sensor, a CCD sensor or the like, and image processors or image processing techniques, such as utilizing aspects of the cameras and image processors described U.S. Pat. Nos. 5,550,677; 5,670,935; 5,760,962; 6,498,620; 6,396,397; 6,222,447; 6,201,642; 6,097,023; 5,877,897; 5,796,094; 5,715,093; 6,922,292; 6,757,109; 6,717,610; 6,590,719; 6,320,176; 6,559,435; 6,831,261; 6,806,452; 6,822,563; 6,946,978; 7,038,577; 7,004,606 and/or 7,720,580, and/or U.S. Pat. Pub. Nos. US-2006-0171704; US-2009-0244361 and/or US-2010-0214791, and/or International Publication Nos. WO 2009/046268 and/or WO 2009/036176, which are all hereby incorporated herein by reference in their entireties, or from one or more imaging systems of the vehicle, such as a reverse or backup aid system, such as a rearward directed vehicle vision system utilizing principles disclosed in U.S. Pat. Nos. 5,550,677; 5,760,962; 5,670,935; 6,201,642; 6,396,397; 6,498,620; 6,717,610 and/or 6,757,109, which are hereby incorporated herein by reference in their entireties, a trailer hitching aid or tow check system, such as the type disclosed in U.S. Pat. No. 7,005,974, which is hereby incorporated herein by reference in its entirety, a cabin viewing or monitoring device or system, such as a baby viewing or rear seat viewing camera or device or system or the like, such as disclosed in U.S. Pat. Nos. 5,877,897 and/or 6,690,268, which are hereby incorporated herein by reference in their entireties, a video communication device or system, such as disclosed in U.S. Pat. No. 6,690,268, which is hereby incorporated herein by reference in its entirety, and/or the like. The imaging sensor or camera may be activated and the display screen may be activated in response to the vehicle shifting into reverse, such that the display screen is viewable by the driver and is displaying an image of the rearward scene while the driver is reversing the vehicle. It is envisioned that an image processor or controller (such as an EYEQ™ image processing chip available from Mobileye Vision Technologies Ltd. of Jerusalem, Israel, and such as an image processor of the types described in International Pub. No. WO 2010/099416, which is hereby incorporated herein by reference in its entirety) may process image data captured by the rearward facing camera to assess glare lighting conditions (such as to detect headlights of following vehicles that may cause glare at the interior and/or exterior rearview mirror assemblies of the equipped vehicle), and the controller may adjust or control the dimming of the electro-optic mirror assembly or assemblies of the equipped vehicle responsive to such image processing.

The mirror assembly may also include user actuatable inputs operable to control any of the accessories of or associated with the mirror assembly and/or an accessory module or the like. The user input may incorporate one or more touch or proximity sensitive user inputs and associated icons or the like so a user can readily identify the purpose or function of the user inputs and actuate the appropriate or desired or selected user input. For example, the mirror assembly may include touch sensitive elements or touch sensors or proximity sensors, such as the types of touch sensitive elements described in U.S. Pat. Nos. 5,594,222; 6,001,486; 6,310,611; 6,320,282; 6,627,918; 7,224,324 and/or 7,253,723, and/or International Publication Nos. WO 2012/051500 and/or WO 2013/071070, which are hereby incorporated herein by reference in their entireties, or such as proximity sensors of the types described in U.S. Pat. Nos. 7,224,324; 7,249,860 and/or 7,446,924, and/or International Publication No. WO 2004/058540, which are hereby incorporated herein by reference in their entireties, or such as membrane type switches, such as described in U.S. Pat. No. 7,360,932, which is hereby incorporated herein by reference in its entirety, or such as detectors and the like, such as the types disclosed in U.S. Pat. Nos. 7,255,541; 6,504,531; 6,501,465; 6,492,980; 6,452,479; 6,437,258 and/or 6,369,804, which are hereby incorporated herein by reference in their entireties, and/or the like, while remaining within the spirit and scope of the present invention.

The mirror assembly may comprise any suitable construction, such as, for example, a mirror assembly with the reflective element being nested in the mirror casing and with a bezel portion that circumscribes a perimeter region of the front surface of the reflective element, or with the mirror casing having a curved or beveled perimeter edge around the reflective element and with no overlap onto the front surface of the reflective element (such as by utilizing aspects of the mirror assemblies described in U.S. Pat. Nos. 7,255,451; 7,289,037; 7,360,932; 8,049,640; 8,277,059 and/or 8,529,108, or such as a mirror assembly having a rear substrate of an electro-optic or electrochromic reflective element nested in the mirror casing, and with the front substrate having curved or beveled perimeter edges, or such as a mirror assembly having a prismatic reflective element that is disposed at an outer perimeter edge of the mirror casing and with the prismatic substrate having curved or beveled perimeter edges, such as described in U.S. Pat. Nos. 8,508,831; 8,730,553; 9,598,016 and/or 9,346,403, and/or U.S. Publication Nos. US-2014-0313563 and/or US-2015-0097955, which are hereby incorporated herein by reference in their entireties (and with electrochromic and prismatic mirrors of such construction are commercially available from the assignee of this application under the trade name INFINITY™ mirror).

Optionally, the mirror assembly may include one or more other accessories at or within the mirror casing, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, transmitters and/or receivers, such as a garage door opener or the like, a digital network, such as described in U.S. Pat. No. 5,798,575, a high/low headlamp controller, such as disclosed in U.S. Pat. Nos. 5,796,094 and/or 5,715,093, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; 5,669,698; 7,195,381; 6,971,775 and/or 7,249,860, microphones, such as disclosed in U.S. Pat. Nos. 7,657,052; 6,243,003; 6,278,377 and/or 6,420,975, speakers, antennas, including global positioning system (GPS) or cellular phone antennas, such as disclosed in U.S. Pat. No. 5,971,552, a communication module, such as disclosed in U.S. Pat. No. 5,798,688, a voice recorder, a blind spot detection system, such as disclosed in U.S. Pat. Nos. 7,720,580; 7,038,577; 6,882,287; 5,929,786 and/or 5,786,772, transmitters and/or receivers, such as for a garage door opener or a vehicle door unlocking system or the like (such as a remote keyless entry system), a digital network, such as described in U.S. Pat. No. 5,798,575, a high/low headlamp controller, such as a camera-based headlamp control, such as disclosed in U.S. Pat. Nos. 5,796,094 and/or 5,715,093, a memory mirror system, such as disclosed in U.S. Pat. No. 5,796,176, a hands-free phone attachment, an imaging system or components or circuitry or display thereof, such as an imaging and/or display system of the types described in U.S. Pat. Nos. 7,400,435; 7,526,103; 6,690,268 and/or 6,847,487, and/or U.S. Pat. Pub. No. US-2006-0125919, a video device for internal cabin surveillance (such as for sleep detection or driver drowsiness detection or the like) and/or video telephone function, such as disclosed in U.S. Pat. Nos. 5,760,962 and/or 5,877,897, a remote keyless entry receiver, a seat occupancy detector, a remote starter control, a yaw sensor, a clock, a carbon monoxide detector, status displays, such as displays that display a status of a door of the vehicle, a transmission selection (4wd/2wd or traction control (TCS) or the like), an antilock braking system, a road condition (that may warn the driver of icy road conditions) and/or the like, a trip computer, a tire pressure monitoring system (TPMS) receiver (such as described in U.S. Pat. Nos. 6,124,647; 6,294,989; 6,445,287; 6,472,979; 6,731,205 and/or 7,423,522, and/or an ONSTAR® system, a compass, such as disclosed in U.S. Pat. Nos. 5,924,212; 4,862,594; 4,937,945; 5,131,154; 5,255,442 and/or 5,632,092, and/or any other accessory or circuitry or the like (with all of the above-referenced patents and publications being commonly assigned and being hereby incorporated herein by reference in their entireties).

Changes and modifications in the specifically described embodiments may be carried out without departing from the principles of the present invention, which is intended to be limited only by the scope of the appended claims as interpreted according to the principles of patent law.

The invention claimed is:

1. A vehicular interior rearview mirror assembly, the vehicular interior rearview mirror assembly comprising:
   a mirror head pivotally adjustable about a mirror support;
   wherein the mirror support is configured to attach at an interior portion of a vehicle equipped with the vehicular interior rearview mirror assembly;
   wherein the mirror head comprises a prismatic mirror reflective element having a transflective mirror reflector that at least partially reflects light incident thereon and at least partially transmits incident light therethrough;

wherein the prismatic mirror reflective element has a front side and a rear side, and wherein, with the mirror support attached at the interior portion of the equipped vehicle, the front side is closer to a driver of the equipped vehicle than the rear side;

wherein the prismatic mirror reflective element comprises a single glass substrate having a first glass surface and a second glass surface that is separated from the first glass surface by a thickness dimension of the single glass substrate, and wherein the transflective mirror reflector is disposed at the second glass surface of the single glass substrate;

wherein the front side of the prismatic mirror reflective element comprises the first glass surface of the single glass substrate;

a video display device disposed rearward of the prismatic mirror reflective element;

wherein the video display device comprises a display screen;

wherein circuitry associated with the display screen is disposed on a flexible printed circuit that is electrically connected at the display screen;

wherein a touch sensor is disposed at the prismatic mirror reflective element, and wherein the touch sensor is associated with circuitry at the flexible printed circuit;

wherein the display screen of the video display device occupies at least 85 percent of a reflective region of the transflective mirror reflector that, with the mirror support attached at the interior portion of the equipped vehicle, is viewable by a driver of the equipped vehicle when viewing the prismatic mirror reflective element;

wherein, with the mirror support attached at the interior portion of the equipped vehicle, the video display device is operable to display video images captured by a rearward viewing camera of the equipped vehicle;

wherein, with the mirror support attached at the interior portion of the equipped vehicle, and when the video display device is operated to display video images, light emitted by the video display device passes through the transflective mirror reflector of the prismatic mirror reflective element for viewing of displayed video images by the driver of the equipped vehicle viewing the prismatic mirror reflective element;

wherein the video display device, when operated to display video images, emits linearly polarized light, and wherein light emitted by the video display device exits the prismatic mirror reflective element as circularly polarized light; and wherein, with the mirror support attached at the interior portion of the equipped vehicle, the prismatic mirror reflective element, at the reflective region of the transflective mirror reflector that is viewable by the driver of the equipped vehicle when viewing the prismatic mirror reflective element, reflects at least 40 percent of visible light incident at the front side of the prismatic mirror reflective element that is viewable by and touchable by the driver of the equipped vehicle.

2. The vehicular interior rearview mirror assembly of claim 1, wherein the display screen comprises a liquid crystal display screen.

3. The vehicular interior rearview mirror assembly of claim 2, wherein the display screen is backlit by at least one light emitting diode.

4. The vehicular interior rearview mirror assembly of claim 3, wherein the at least one light emitting diode for backlighting the display screen comprises a plurality of light emitting diodes.

5. The vehicular interior rearview mirror assembly of claim 1, wherein, with the mirror support of the vehicular interior rearview mirror assembly attached at the interior portion of the equipped vehicle, the flexible printed circuit is disposed within the mirror head behind the prismatic mirror reflective element.

6. The vehicular interior rearview mirror assembly of claim 1, wherein the mirror support is configured to attach at a mirror mounting button attached at an in-cabin side of a windshield of the equipped vehicle.

7. The vehicular interior rearview mirror assembly of claim 1, wherein the display screen is optically coupled with a polymer reflector layer via an optical adhesive.

8. The vehicular interior rearview mirror assembly of claim 7, wherein linearly polarized light emitted by the video display device is circularly polarized as it passes through the polymer reflector layer.

9. The vehicular interior rearview mirror assembly of claim 1, wherein, with the mirror support attached at the interior portion of the equipped vehicle, the prismatic mirror reflective element, at the reflective region of the transflective mirror reflector that is viewable by the driver of the equipped vehicle when viewing the prismatic mirror reflective element, transmits at least 35 percent of visible light emitted by the video display device.

10. The vehicular interior rearview mirror assembly of claim 1, wherein the video display device comprises a heatsink configured to draw heat away from the display screen.

11. The vehicular interior rearview mirror assembly of claim 1, wherein a polymer reflector layer is disposed between the prismatic mirror reflective element and the video display device, and wherein the polymer reflector layer converts linearly polarized light emitted by the video display device to circularly polarized light as the light emitted by the video display device passes through the polymer reflector layer.

12. The vehicular interior rearview mirror assembly of claim 1, wherein the single glass substrate of the prismatic mirror reflective element comprises an exposed rounded perimeter edge that provides a curved transition between the first glass surface of the single glass substrate and an outer surface of a mirror casing of the vehicular interior rearview mirror assembly.

13. The vehicular interior rearview mirror assembly of claim 1, wherein a mirror casing of the vehicular interior rearview mirror assembly circumscribes a perimeter edge of the single glass substrate and provides a curved transition between the first glass surface of the single glass substrate and an outer surface of a side wall of the mirror casing.

14. A vehicular interior rearview mirror assembly, the vehicular interior rearview mirror assembly comprising:
a mirror head pivotally adjustable about a mirror support;
wherein the mirror support is configured to attach at an interior portion of a vehicle equipped with the vehicular interior rearview mirror assembly;
wherein the mirror head comprises a prismatic mirror reflective element having a transflective mirror reflector that at least partially reflects light incident thereon and at least partially transmits incident light therethrough;
wherein the prismatic mirror reflective element has a front side and a rear side, and wherein, with the mirror support attached at the interior portion of the equipped vehicle, the front side is closer to a driver of the equipped vehicle than the rear side;

wherein the prismatic mirror reflective element comprises a single glass substrate having a first glass surface and a second glass surface that is separated from the first glass surface by a thickness dimension of the single glass substrate, and wherein the transflective mirror reflector is disposed at the second glass surface of the single glass substrate;

wherein the front side of the prismatic mirror reflective element comprises the first glass surface of the single glass substrate;

a video display device disposed rearward of the prismatic mirror reflective element;

wherein the video display device comprises a display screen;

wherein circuitry associated with the display screen is disposed on a flexible printed circuit that is electrically connected at the display screen;

wherein a touch sensor is disposed at the prismatic mirror reflective element, and wherein the touch sensor is associated with circuitry at the flexible printed circuit;

wherein the display screen of the video display device occupies at least 85 percent of a reflective region of the transflective mirror reflector that, with the mirror support attached at the interior portion of the equipped vehicle, is viewable by a driver of the equipped vehicle when viewing the prismatic mirror reflective element;

wherein, with the mirror support attached at the interior portion of the equipped vehicle, the video display device is operable to display video images captured by a rearward viewing camera of the equipped vehicle;

wherein, with the mirror support attached at the interior portion of the equipped vehicle, and when the video display device is operated to display video images, light emitted by the video display device passes through the transflective mirror reflector of the prismatic mirror reflective element for viewing of displayed video images by the driver of the equipped vehicle viewing the prismatic mirror reflective element;

wherein a polymer reflector layer is disposed between the prismatic mirror reflective element and the video display device, and wherein the polymer reflector layer converts linearly polarized light emitted by the video display device to circularly polarized light as the light emitted by the video display device passes through the polymer reflector layer;

wherein light emitted by the video display device exits the prismatic mirror reflective element as circularly polarized light;

wherein, with the mirror support attached at the interior portion of the equipped vehicle, the prismatic mirror reflective element, at the reflective region of the transflective mirror reflector that is viewable by the driver of the equipped vehicle when viewing the prismatic mirror reflective element, reflects at least 40 percent of visible light incident at the front side of the prismatic mirror reflective element that is viewable by and touchable by the driver of the equipped vehicle; and wherein the video display device comprises a heatsink configured to draw heat away from the display screen.

15. The vehicular interior rearview mirror assembly of claim 14, wherein the display screen comprises a liquid crystal display screen.

16. The vehicular interior rearview mirror assembly of claim 15, wherein the display screen is backlit by at least one light emitting diode.

17. The vehicular interior rearview mirror assembly of claim 16, wherein the at least one light emitting diode for backlighting the display screen comprises a plurality of light emitting diodes.

18. The vehicular interior rearview mirror assembly of claim 14, wherein, with the mirror support of the vehicular interior rearview mirror assembly attached at the interior portion of the equipped vehicle, the flexible printed circuit is disposed within the mirror head behind the prismatic mirror reflective element.

19. The vehicular interior rearview mirror assembly of claim 14, wherein the mirror support is configured to attach at a mirror mounting button attached at an in-cabin side of a windshield of the equipped vehicle.

20. The vehicular interior rearview mirror assembly of claim 14, wherein the display screen is optically coupled with the polymer reflector layer via an optical adhesive.

21. The vehicular interior rearview mirror assembly of claim 14, wherein, with the mirror support attached at the interior portion of the equipped vehicle, the prismatic mirror reflective element, at the reflective region of the transflective mirror reflector that is viewable by the driver of the equipped vehicle when viewing the prismatic mirror reflective element, transmits at least 35 percent of visible light emitted by the video display device.

22. The vehicular interior rearview mirror assembly of claim 14, wherein the single glass substrate of the prismatic mirror reflective element comprises an exposed rounded perimeter edge that provides a curved transition between the first glass surface of the single glass substrate and an outer surface of a mirror casing of the vehicular interior rearview mirror assembly.

23. The vehicular interior rearview mirror assembly of claim 14, wherein a mirror casing of the vehicular interior rearview mirror assembly circumscribes a perimeter edge of the single glass substrate and provides a curved transition between the first glass surface of the single glass substrate and an outer surface of a side wall of the mirror casing.

* * * * *